(12) United States Patent
Lee et al.

(10) Patent No.: US 6,785,471 B2
(45) Date of Patent: Aug. 31, 2004

(54) OPTICAL SAMPLING USING INTERMEDIATE SECOND HARMONIC FREQUENCY GENERATION

(75) Inventors: Gregory S. Lee, Mountain View, CA (US); Roger Lee Jungerman, Petaluma, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 679 days.

(21) Appl. No.: 09/885,154

(22) Filed: Jun. 20, 2001

(65) Prior Publication Data

US 2003/0007205 A1 Jan. 9, 2003

(51) Int. Cl.[7] .................. H04B 10/08; H04B 17/00; G01B 9/02
(52) U.S. Cl. ........................... 398/25; 356/450
(58) Field of Search .................. 356/450; 398/25, 398/16, 207

(56) References Cited

U.S. PATENT DOCUMENTS

| | | | |
|---|---|---|---|
| 4,505,587 A | | 3/1985 | Haus et al. .............. 356/345 |
| 5,050,988 A | * | 9/1991 | Sugiyama et al. ........ 356/121 |

OTHER PUBLICATIONS

L. Becouarn et al., "Cascaded Second Harmonic and Sum–Frequency Generation of a CO2 Laser Using a Single Quasi–Phase–Matched GaAs Crystal", CLEO '98, 1998.*
Nogiwa, et al., "Highly Sensitive and Time–Resolving Optical Sampling System Using thin PPLN Crystal, " IEE 2000, Electronics Letters Online No.: 20001192, DO1:10.1049/el:20001192, Aug. 7, 2000.
Galvanauskas et al., "Fiber–laster–based Femtosecond Parametric Generator in Bulk Periodically Poled LiNbO$_3$," Optics Letter, vol. 22, No. 2, Jan. 15, 1997.
Arbpre et al., "Frequency Doubling of Femtosecond Erbium–Fiber Soliton Lasers in Periodically Poled Lithium Niobate," Optics letters, vol. 22, No. 1, Jan. 1, 1997.
Nogiwa, et al., "Generation of Gain–Switched Optical Pulses with Very Low Timing Jitter by Using External CW–Light injection Seeding," Electronics Letters, vol. 36, No. 3, Feb. 3, 2000.
Ohta, et al., "Measurement of 200 Gbit/s Optical Eye Diagram by Optical Sampling with Gain–Switched Optical Pulse," Electronics Letters, vol. 36, No. 8, Apr. 13, 2000.
Takara, et al., "100 Gbits/s Optical signal Eye–Diagram Measurement with Optical Sampling using organic Nonlinear Optical Crystal," Electronics Letters, vol. 32, No. 24, Nov. 21, 1996.
Nogiwa et al., "Improvement of Sensitivity in Optical Sampling System," Electronics letters, vol. 35, No. 11, May 27, 1999.
Haus et al., "Picosecond Optical Sampling," 1980 IEEE.

* cited by examiner

Primary Examiner—Leslie Pascal
Assistant Examiner—Shi K. Li

(57) ABSTRACT

An optical sampling method and apparatus use a probe pulse source of a predetermined optical wavelength range, e.g., 1560 nm, to sample incoming optical pulses in approximately the same wavelength range. The probe pulse source is frequency-doubled e.g., using a frequency doubler such as a nonlinear PPLN crystal, to obtain an intermediate second harmonic which may be filtered with a 780 nm bandpass filter to eliminate at least source frequency noise background. The filtered intermediate second harmonic is then mixed with the user input signal using an optional polarizing beam splitter and a dichroic beam splitter. The mixed signal is sent to a sum frequency generating (SFG) nonlinear crystal, e.g., a PPLN crystal, where the resulting frequency is near the third harmonic. The output from the SFG PPLN crystal may be filtered using a bandpass 515 nm filter to remove unwanted wavelengths and processed to measure/sense the near third harmonic content using a photomultiplier tube (PMT). Beyond the PMT, the output may be sent to a microprocessor for analysis and display on a cathode ray oscilloscope as necessary. 80–85% power conversion efficiency in the frequency doubler, a 60 or 65% photon conversion efficiency in the sampler and handling of 600+ GHz bandwidths, as well as background noise reduction are possible by using the invention.

31 Claims, 4 Drawing Sheets

OPTICAL SAMPLING USING INTERMEDIATE SECOND HARMONIC FREQUENCY GENERATION

BACKGROUND OF THE INVENTION

1. Technical Field of the Invention

This relates to an improved method and system for obtaining optical samples of good quality in optical communications.

2. Description of Related Art

Optoelectronics technology and its applications are expanding with the result that integrated optics technology can be used with considerable advantages in communications. Optical modulators, switches, multiplexers are commonly employed by fabricating them both on single substrates of both dielectrics and semiconductors. For measuring the waveforms of optical pulses used in high bit rate optical communications, it is common practice and desirable to use optical sampling with high sensitivity and high time resolution. Optical sampling systems often use a probe signal and optical mixing with a user signal to achieve what is known as sum frequency generation (SFG) which is very useful for obtaining eye diagrams for sampled user signals. SFG methods of optical sampling might result in undesirably high background noise. Higher pump powers for optical sampling systems are desirable, but result in greater need to eliminate background noise, because background noise increases as the square of the probe intensity.

It is to be noted that sum frequency generation (SFG) generally uses a sampling process in a nonlinear crystal such as a periodically poled lithium niobate (PPLN) crystal. The use of a PPLN crystal in optical sampling systems is taught for example in the publication "Highly Sensitive and Time-Resolving Optical Sampling System Using thin PPLN Crystal" by S. Nogiwa, et al., which is incorporated herein by reference. PPLN crystals as opposed to other nonlinear crystals, e.g., KTP (potassium titanyl phosphate), have a large sum frequency generation efficiency under quasi-phase matching conditions. By a judicious selection of the PPLN crystal thickness, reduction of the time resolution of the system and increase of the wavelength band width can be achieved.

When optical mixing is used as the sampling mechanism, the resulting "background noise" is highly undesirable. Presently, most optical sampling schemes other than those based on series connected photo-conductive switches (PCS's) have an associated background noise problem. This is especially true of 1·55 nm signal sampling instruments which are based on 1·55 nm probe sources.

Optical sampling modules are commercially available with a variety of features and applications with wavelength capabilities of 1550–1650 nm and some with 1100–1650 nm. Other wavelength capabilities for commercially available optical sampling modules are also known. Also, because of the availability of optical amplifiers in the 1550 nm wavelength band, there are several technologies available for obtaining short optical sampling pulses near 1550 nm. Examples of such include gain-switched semiconductor lasers and Erbium-Doped Fiber Ring Lasers.

High-speed sampling of optical signals facilitates reliable oscilloscope measurements of sampled signals. It has been found that a narrow sampling aperture enables achieving higher bandwidths than would be achievable with regular electrical sampling techniques. Commercial short optical sampling pulse sources near the 1550 nm range may indeed be obtained for this purpose. However, in most instances the input signals to be sampled also fall in the same 1550 nm wavelength band, which makes it difficult to distinguish the input signals from the probe or sampling pulse signals, compounding the background noise problem and, complicating the measurement system design.

Thus, there is a need for sampling optical input signals of the 1550 nm wavelength range using commercially available probe/pump sources which also have the 1550 nm range. By simply using SFG and mixing the incoming signals with the user input signals, the background noise is not automatically reduced to acceptable levels. There is therefore a specific need while using commercially available probes of 1550 nm wavelength range with input signals, also of approximately 1550 nm range, to reduce background noise so as to make the output measurable and to have a clean optical sample.

SUMMARY OF THE INVENTION

This invention is directed to optical sampling from signals, using intermediate second harmonic generation, preferably using nonlinear conversion techniques. Described hereinafter are a method and apparatus which enable easy and efficient sampling of input signals which are in the 1560 nm range (i.e., 1.56 um), the probe signals also being in the 1550 to 1560 nm range. Resorting to SFG techniques, because of the close proximity between the wavelength ranges of the signal to be measured and the probe signal, it is difficult to design an optical bandpass filter. The above problem is addressed by the invention by using a frequency-doubled probe in the first stage. The invention uses intermediate second harmonic generation (SHG) of the probe pump to 0.775 micrometer (775 nm) and a fundamental wavelength rejection filter as essential components to the scheme. The 775 nm is mixed in the second stage with a user input signal of 1550 nm wavelength range to generate green light approximating a third harmonic which can be filtered to eliminate most everything other than the near third harmonic wavelength of 515 nm range. A sum frequency generation (SFG) sampling crystal is used for this purpose. The filtered near third harmonic is sensed by using a photomultiplier tube, and optionally processed using an analog-to-digital converter, and an electrical sampler with a microprocessor for possible display on a cathode ray oscilloscope.

The invention in its broad form resides in an optical sampling method by nonlinear conversion for sampling optical input signals in optical communication, comprising:

using a probe pulse source of predetermined wavelength range and frequency-doubling signals from said pulse source to obtain an intermediate output containing a second harmonic probe pulse signal, said frequency doubling being accomplished preferably using a first nonlinear crystal;

filtering said intermediate output to filter out background corresponding to said predetermined wavelength, leaving the second harmonic probe pulse signal after filtering;

mixing the filtered second harmonic probe pulse signal with a user input optical signal and obtaining a near third harmonic signal; and processing the near third harmonic signal in a desired manner to obtain samples of the user input optical signal.

In a preferred embodiment, the step of mixing comprises using a dichroic beam splitter, and the step of obtaining the near third harmonic signal comprises using SFG in a nonlinear crystal. Preferably, the step of frequency-doubling the wavelength comprises using a nonlinear periodically poled lithium niobate (PPLN) crystal. The nonlinear crystals may comprise PPLN or other crystals of predetermined thickness and length.

Preferably, the probe pulse source comprises a passive mode-locked fiber ring laser (or, alternatively, an active mode-locked fiber ring laser), and the step of processing comprises using an analog-to-digital converter (ADC) to obtain high-speed processed sampled signals, the method further including microprocessor control and analysis. At least one advantage of the present scheme is that if a pedestal (low DC light level with a higher power spike) is present on the 1550 nm probe signal, it is considerably reduced after the second harmonic generation. This improves the dynamic range of the measurement system.

Optionally, the invention includes the step of achieving at least 50% conversion efficiency in obtaining the near third harmonic signal, and includes the step of narrowing pulse width of pulse source signals, giving greater system bandwidth.

The step of filtering may comprise using cascaded filters, and said user input optical signal may be in the 1560 nanometer wavelength range.

The invention also resides in an optical sampling system to obtain a sample from an optical input signal, comprising:
- a probe pulse signal source of a predetermined wavelength range;
- a frequency doubler for frequency-doubling the probe pulse signal source to obtain an intermediate output containing a second harmonic probe pulse signal;
- a filter to filter said output to delete background corresponding to said predetermined wavelength, leaving a filtered second harmonic probe pulse signal;
- a mixer for mixing the filtered second harmonic probe signal with a user input optical signal to obtain a near third harmonic signal; and
- a processor for processing the near third harmonic signal in a desired manner to obtain samples of the user input optical signal.

In a preferred embodiment, the mixer comprises a dichroic beam splitter and a nonlinear crystal which might comprise a periodically poled lithium niobate (PPLN) crystal. Optionally, the PPLN crystal is doped with one of MgO and ZnO to raise the damage threshold of the PPLN. The nonlinear crystal may comprise material chosen from LiNbO3, LiTaO3, KTP, RTP, RTA, GaAs, AlGaAs, ZnS, ZnTe, and ZnSeTe, and the probe pulse signal source may comprise a passive mode-locked fiber ring laser.

An embodiment of the invention includes a third harmonic filter and an analog-to-digital converter for receiving said near third harmonic signal after filtration, and optionally a microprocessor for receiving and analyzing output from said analog-to-digital converter.

BRIEF DESCRIPTION OF THE DRAWINGS

A more detailed understanding of the invention may be had from the following description of preferred embodiments, given by way of example and to be understood in conjunction with the accompanying drawing wherein.

DETAILED DESCRIPTION OF THE PREFERRED EXEMPLARY EMBODIMENTS OF THE PRESENT INVENTION

Figure 1:
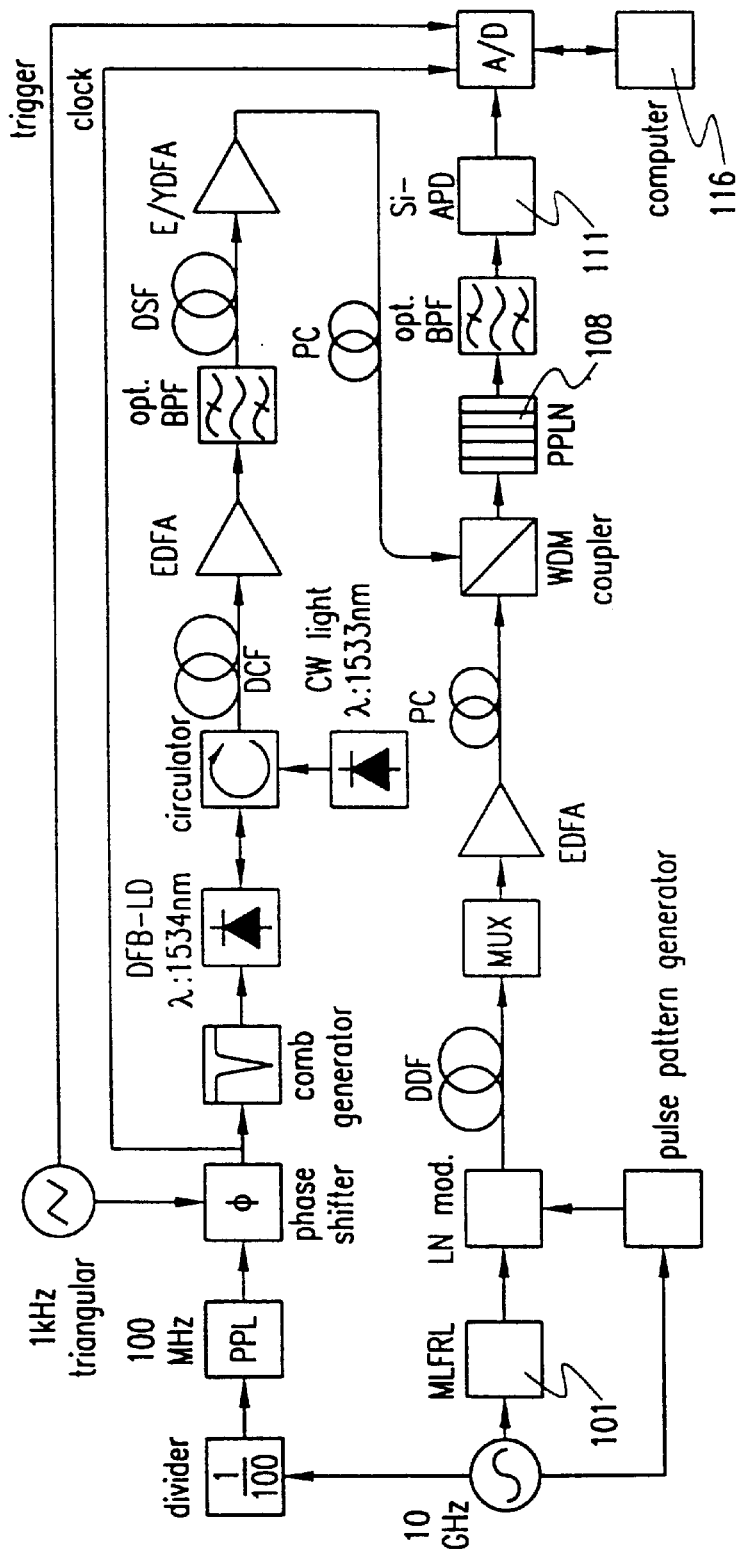
FIG. 1 is a prior art schematic illustrating an optical sampling system using a thin PPLN crystal.

FIG. 1 shows a prior art experimental setup for producing SFG by using a 1.4 mm thick PPLN crystal as the SFG material instead of a KTP crystal or a conventional 10 mm thick PPLN crystal. A mode-locked fiber ring-laser (MLFRL) generates optical signal pulses at 10 GHz repetition rate. The optical signal pulses are modulated by a $LiNbO_3$ modulator (LN mod.) to a 10 Gbit/s optical signal, and its pulsewidth is compressed from 4.9 to 1.3 ps in a dispersion-decreasing fiber (DDF). The modulated and compressed optical signal is time-division-multiplexed to a 160 Gbit/s optical signal by using an optical multiplexer (MUX) consisting of four split-relatively-delay-and-recombine fiber doublers.

The optical sampling pulses are generated by a gain-switched distributed-feedback laser diode (DFB-LD) with a repetition rate of 100 MHz. The timing jitter of the gain-switched optical pulses is reduced to 160 fs by using a continuous wave (CW) light-seeding method. These pulses are then compressed to a 0.98 ps pulsewidth and amplified to 40 mW average-power by using a known system. The optical sampling pulses are synchronized with the optical signal pulses by a frequency divider and a phase-locked loop (PLL) circuit, and their phase is swept by an electrical phase shifter.

The compressed optical sampling and signal pulses are combined by a wavelength division multiplex (WDM) coupler. SFG takes place in nonlinear crystal PPLN, wherein the crystal has a QPM period of 18.9 um The wavelengths of the optical signal and sampling pulses are 1560 and 1534 nm, respectively. The beam-waist diameter of these pulses is 28 um. The sum-frequency light is detected by an avalanche photodiode (APD). The detected signal is converted into a digital signal by using an analogue-digital converter (A/D) and the eye diagram of the signal is finally displayed on a computer. However, the above prior art method of optical sampling is not devoid of background noise problems, which makes it very difficult to obtain a clear optical sample. This is especially so because of the proximity of the sampling/probe pulses to the optical signal.

Figure 2:
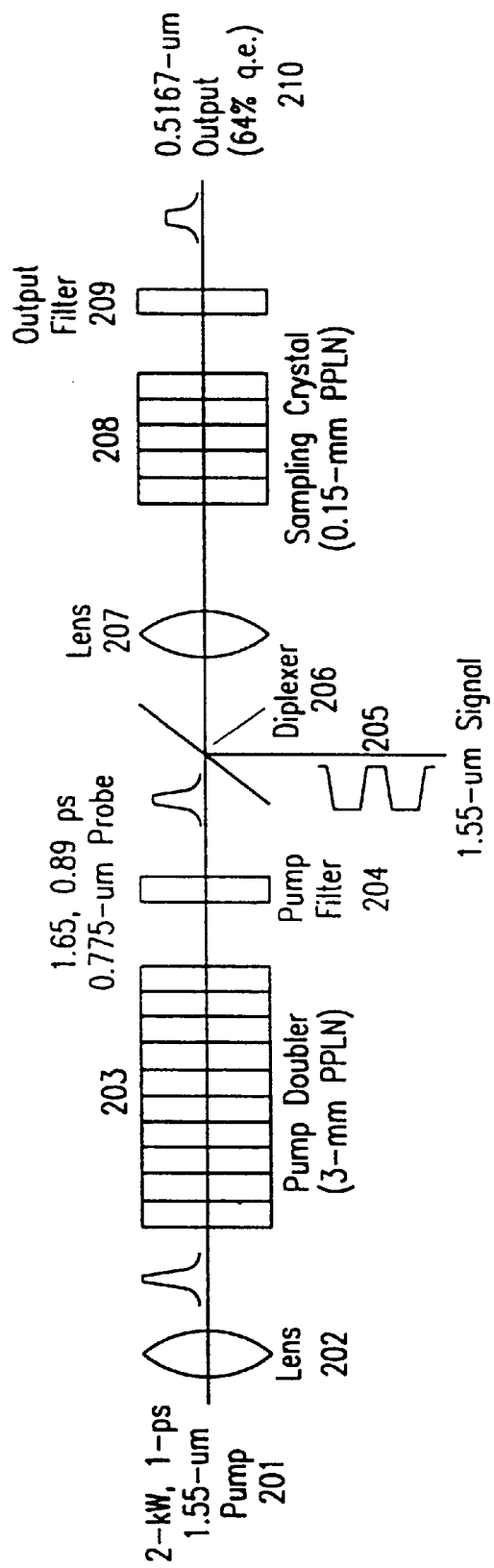
FIG. 2 illustrates the principles of the present invention and shows conversion efficiencies achieved.

FIG. 2 illustrates a simplified arrangement showing the principles of the invention using SFG and certain specific details. Pump 201 produces the sampling pulses of 1 picosecond and is shown as having a peak power of 2 kilowatts. The generated sampling pulses are passed through lens 202 and then passed through pump doubler 203 which as illustrated could be a 3 mm thick PPLN nonlinear crystal. The output from the nonlinear crystal 203 essentially has a significant intermediate second harmonic component with a wavelength of 0.775 micrometers and an output strength of 1.65 kilowatts as illustrated. Additionally, the output from the pump doubler PPLN crystal 203 may contain a small component of the third harmonic and a significant amount of the fundamental frequency which is not doubled. The fundamental frequency which is not doubled adds to the undesirable background noise. To eliminate the background noise composed of the fundamental frequency and to a small degree, the third harmonic frequency, a pump filter 204 is utilized. The pump filter 204 has the property of allowing just the second harmonic frequency and arresting the fundamental frequency and the third harmonic. In other words, the pump filter may be a bandpass filter which lets through the majority of the second harmonic frequency signal. The intermediate second harmonic frequency signal coming out of the pump filter is mixed with the 1.55 micrometer user input signal 205 in a diplexer 206 and the output is subsequently taken through lens 207 which is optional. The output subsequently is processed through a nonlinear crystal 208 which is illustrated as a sampling crystal, 0.15 millimeter PPLN. The sampling crystal 208 performs the sum frequency generation function, bringing out an output which is passed through the output filter 209 which lets through an optical sample 210 devoid of the background noise and of enhanced quality.

Figure 3:
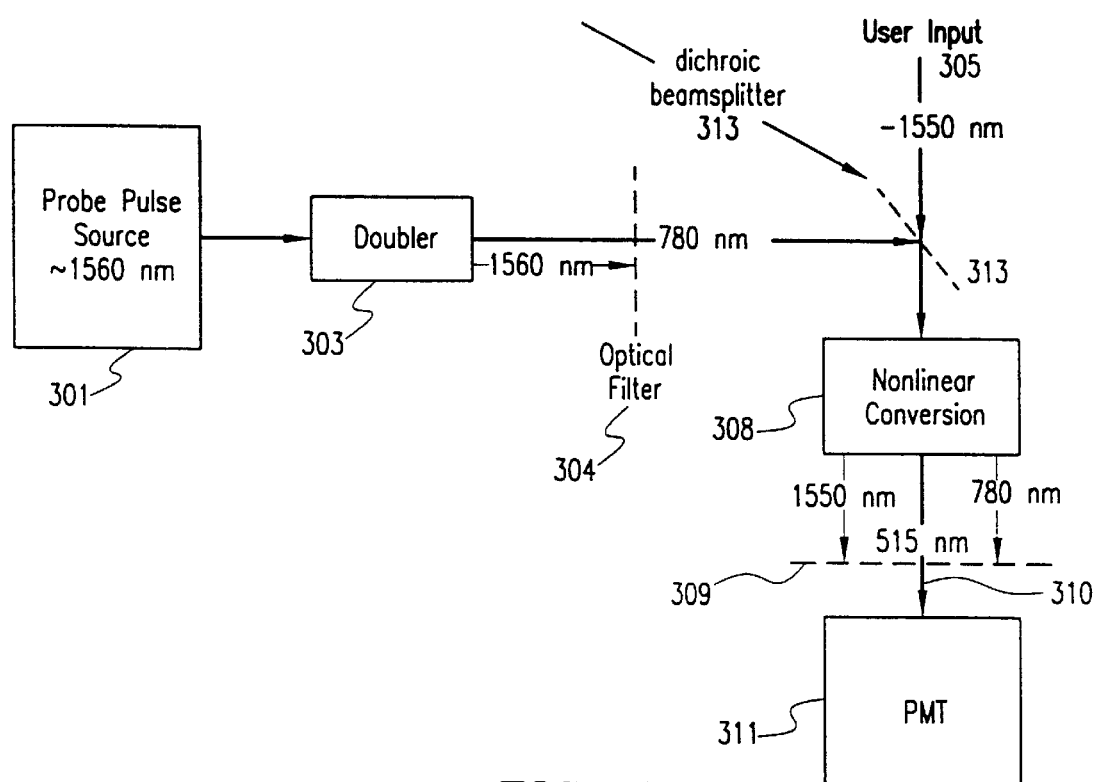
FIG. 3 shows a schematic of a system including second harmonic and sum frequency generation.

FIG. 3 is a functional diagram which illustrates the processing of the signals on the same lines as indicated in FIG. 2 but with specific structure. A probe pulse source shown at 301 produces probe output pulses at a wavelength of 1560 nanometers, which output is sent to a doubler shown at 303. Doubler 303 produces a second harmonic from the fundamental frequency generated by probe pulse 301, and in the process also produces a small component of third harmonic and a significant amount of unconverted fundamental frequency signal which end up as background noise. This signal which has all the three components, namely, the second harmonic, the fundamental harmonic and the small component of third harmonic, is then passed through optical filter 304 which advantageously filters out the unwanted background noise and the third harmonic and lets through only the intermediate second harmonic at a wavelength of approximately 780 nanometers. The frequency-doubled signal that emerges from the optical filter 304 is processed using the dichroic beam splitter 313 to be mixed with an incoming user input signal 305 to produce a mixture of the two signals. This mixture is processed in an SFG nonlinear conversion stage at 308. The nonlinear conversion stage may be another PPLN or could be any other suitable nonlinear crystal that is known in the art. The output signal from the nonlinear conversion stage 308 consists of predominantly a near third harmonic at substantially 515 nanometers, and a small fraction of a fundamental component at 1560 nanometers, a second harmonic frequency at 780 nanometers. This output signal is passed through a bandpass filter shown at 309 to let through largely the near third harmonic and arrest the fundamental frequency and the second harmonic. The output from the filter, which is shown at 310 and is predominantly a near third harmonic which is a good optical sample, is subsequently processed at a photomultiplier tube (PMT) 311.

Figure 4:
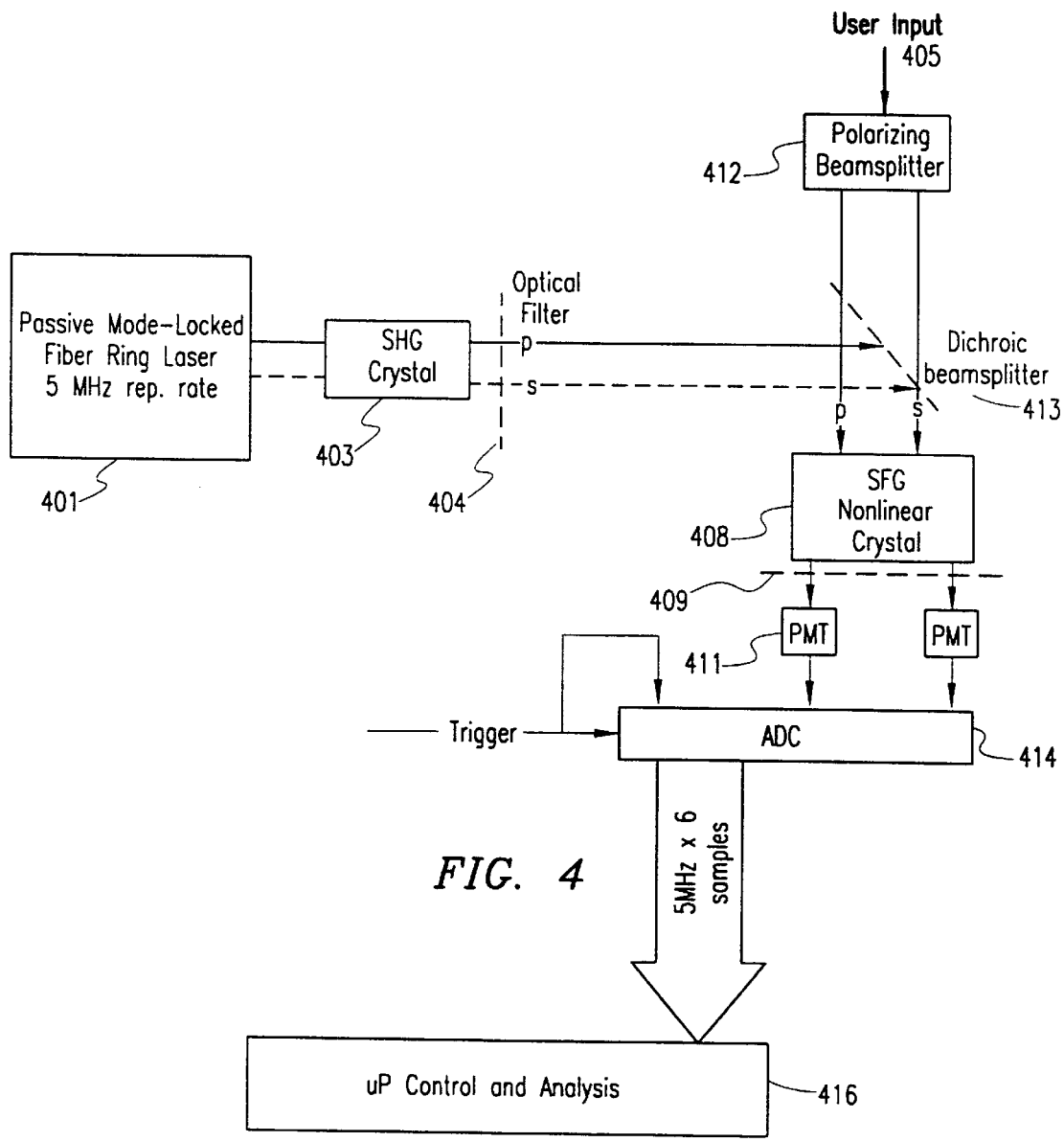
FIG. 4 shows a preferred version of the implementation of an embodiment of the present invention.

FIG. 4 illustrates generally the arrangement of FIG. 3 but, additionally includes the details of how the signal coming out of the second filter may be processed using an electrical sampler and an oscilloscope. As shown in FIG. 4, the probe pulse source may be a passive mode-locked fiber ring-laser 401 which generates a pulse at 1560 nanometers. The output from the pulse source is processed at second harmonic generation crystal 403 which may be a PPLN doubler or any other nonlinear crystal which performs the same function, for example, a potassium titanyl phosphate crystal which is known in the art as a KTP crystal. The nonlinear crystal 403 generates an intermediate second harmonic output which is passed through optical filter 404, and the filtered intermediate second harmonic output is sent to the dichroic beam splitter 413 to be mixed with a user input signal 405 at 1550 nm, which is made to pass through a beam splitter 412. The intermediate second harmonic and the user input signal get mixed in dichroic beam splitter 413 to produce an output which is made to pass through a filter 409. The output coming out of 409 is preferably in two branches (for two polarization converters), both of which are processed by photomultiplier tubes PMT illustrated at 411. Alternatively, the output from the optical sampler can be processed in an avalanche photodiode. Additionally, the signals coming out of photomultiplier tubes 411 may be processed at an analog-to-digital converter ADC shown at 414 in FIG. 4. The output from the analog-to-digital converter 414 is processed at microprocessor control and analysis shown at 416. By the use of the present invention, rather than use the sum frequency generation technique by mixing a user input signal directly with a probe pulse source, an intermediate second harmonic from the probe pulse source is mixed with a user input signal in a nonlinear crystal such as PPLN with attendant advantages. The background noise which is in the vicinity of the fundamental frequency is mostly eliminated at the filter 404 whereby the quality of the optical sample is enhanced.

By the use of the invention, the probe pulse source at 1560 nanometers is efficiently doubled in a nonlinear crystal using significantly high peak powers. Also utilized in the invention is the fact that commercial probe sources of 1560/780 nanometer pulsed outputs are abundantly available. Any residual undoubted probe signal emerging from SHG crystal 403 can be efficiently filtered out using cascaded filters with negligible loss of the 780 nanometer component of the probe signal. This filtering is simplified because of the fact that the two wavelengths which are being handled by the filter 404 have a 1:2 relationship. Similarly, the user input signal 405 and the intermediate second harmonic of the probe signal have a near 1:2 relationship so that they can be combined in a dichroic beam splitter with little loss.

The final nonlinear conversion can be efficient in the vicinity of 50% or higher, using high peak powers in the probe. The nonlinear crystals 403 and 408 respectively, can be optimized in terms of dimensions for efficient generation of the intermediate second harmonic for handling the user input signal namely 1550 nanometers and to produce a near third harmonic close to 515 nanometers with high efficiency. Consequently, the probe is not depleted, and optical filtering techniques eliminate any background signal. Prior art methods with lower peak powers often had conversion efficiencies as low as 1%. Judiciously dimensioned PPLNs together with a frequency-doubled probe signal make it possible to achieve a 46 nanometer spectral acceptance in the final signal, by the use of the invention. The length of the nonlinear PPLN crystal 403 that generates the second harmonic from the probe signal is advantageously in the range of 2 to 3 millimeters, whereas the second nonlinear crystal 408 could be in the range of ½ a millimeter to 1 millimeter in length. Other lengths and crystal materials which could provide suitable performance are also within the scope of the invention.

The material for nonlinear crystals 403 and 408 may be chosen from LiNbO3, KNbO3, LiTaO3, KTP, RTP, RTA, GaAs, AlGaAs, ZnS and other materials known in the art. However, the preferred material is LiNbO3 (lithium niobate). Likewise, the structure and materials of the lenses 202, 207, and the filters 204 (404) and 209 (409) are not unique to the invention and may be chosen to satisfy the functional needs of the components.

The foregoing method and system offer a commercially inexpensive alternative, devoid of undesirable fundamental noise frequency problems encountered with prior art systems exemplified by Nogiwa et al, referenced hereinabove, for optical sampling purposes.

Although preferred embodiments of the method and apparatus of the present invention have been illustrated in the accompanying drawings as described in the foregoing detailed description, it will be understood that the invention is not limited to the embodiments disclosed, but is capable of numerous rearrangements, modifications, equivalents and substitutions without departing from the scope of the invention as set forth in the appended claims.

We claim:

1. An optical sampling method for sampling input optical signals in optical communications, comprising:

using a probe pulse source of a predetermined wavelength range and frequency-doubling signals from said probe pulse source to obtain an intermediate output containing a second harmonic probe pulse signal;

filtering said intermediate output to filter out background including that corresponding to said predetermined wavelength, leaving a filtered intermediate second harmonic probe pulse signal;

mixing the filtered intermediate second harmonic probe pulse signal with a user input optical signal and obtaining a near third harmonic signal; and processing the near third harmonic signal to obtain samples of the user input optical signal.

2. A method as in claim 1 wherein the step of frequency-doubling comprises using a nonlinear crystal, and wherein the step of mixing comprises using a dichroic beam splitter.

3. A method as in claim 2 wherein the step of frequency doubling the wavelength comprises using a periodically poled lithium niobate (PPLN) nonlinear crystal.

4. A method as in claim 1 wherein the step of mixing and obtaining a near third harmonic signal comprises using a nonlinear crystal.

5. A method as in claim 4 wherein the nonlinear crystal comprises a periodically poled lithium niobate (PPLN) crystal.

6. A method as in claim 1 wherein the probe pulse source comprises one of an active mode-locked fiber ring laser and a passive mode-locked fiber ring laser, and wherein said step of processing the near third harmonic signal comprises using one of a photomultiplier tube and an avalanche photodiode.

7. A method as in claim 1 wherein the step of processing comprises using an analog-to-digital converter (ADC) to obtain high-speed processed sampled signals, the method further including microprocessor control and analysis.

8. A method as in claim 1, including the step of narrowing a pulsewidth of the probe pulse source signals, giving greater system bandwidth.

9. A method as in claim 1 wherein the step of filtering comprises using cascaded filters, and wherein said user input optical signal is in the 1550 nanometer wavelength range.

10. A method as in claim 1 wherein said probe pulse source provides pulses of approximately 1560 nanometer wavelength range.

11. An optical sampling system to obtain a sample from a user input optical signal, comprising:

a probe pulse signal source of a predetermined wavelength range;

a frequency doubler for frequency-doubling the probe pulse signal source to obtain an intermediate second harmonic output containing a second harmonic probe pulse signal;

a filter to filter said intermediate second harmonic output to delete at least background corresponding to said predetermined wavelength, leaving a filtered intermediate second harmonic probe pulse signal;

a mixer for mixing the filtered intermediate second harmonic probe signal with a user input optical signal to obtain a near third harmonic signal; and a processor for processing the near third harmonic signal in a desired manner to obtain samples of the user input optical signal with reduced background noise.

12. A system as in claim 11, wherein said mixer comprises a dichroic beam splitter and a nonlinear crystal.

13. A system as in claim 12, wherein said nonlinear crystal comprises a periodically poled lithium niobate (PPLN) crystal.

14. A system as in claim 13, where the PPLN crystal is doped with one of MgO and ZnO to raise a damage threshold of the PPLN crystal.

15. A system as in claim 12, wherein said nonlinear crystal comprises material chosen from LiNbO3, KNbO3, LiTaO3, KTP, RTP, RTA, GaAs, Al GaAs, ZnS, ZnTe, and ZnSeTe.

16. A system as in claim 11, wherein the probe pulse signal source comprises a passive mode-locked fiber ring laser.

17. A system as in claim 11 including a third harmonic filter, and an analog-to-digital converter for receiving said near third harmonic signal after filtration.

18. A system as in claim 17 including a microprocessor for receiving and analyzing output from said analog-to-digital converter.

19. A system as in claim 11, wherein the user input optical signal comprises a signal in 1550 nanometer wavelength range, and wherein said predetermined wavelength range includes a 1560 nanometer wavelength range.

20. A system as in claim 11, wherein the probe pulse signal source generates pulses including those in 1560 nanometer wavelength range.

21. A system as in claim 20 wherein said filter for filtering said second harmonic output comprises a bandpass filter in the 775–780 nm range.

22. A system as in claim 11 wherein said frequency doubler comprises a periodically poled lithium niobate (PPLN) nonlinear crystal.

23. A system as in claim 22 wherein said PPLN crystal has a length having a range of 2 to 3 mm.

24. A system as in 11 wherein said mixer comprises a periodically poled lithium niobate (PPLN) nonlinear crystal.

25. A system as in claim 24 wherein said PPLN crystal has a length having a range of ½ to 1 mm.

26. A system as in claim 11 wherein said third harmonic filter comprises a bandpass filter.

27. A system as in claim 11 wherein said processor includes an avalanche photodiode (APD).

28. A system as in claim 11, wherein said processor includes a photomultiplier tube (PMT).

29. A system as in claim 11 wherein said processor includes an analog-to-digital converter.

30. A system as in claim 11 wherein said processor includes a microprocessor and analyzer.

31. A system as in claim 11, wherein said processor comprises an analog-to-digital converter and a microprocessor.

* * * * *